(12) United States Patent
Hladik et al.

(10) Patent No.: US 9,213,113 B2
(45) Date of Patent: Dec. 15, 2015

(54) CLOCK SYNCHRONIZATION OVER FIBER

(71) Applicant: INOVA, LTD., Grand Cayman (KY)

(72) Inventors: Timothy D. Hladik, Calgary (CA); Hua Ai, Calgary (CA)

(73) Assignee: INOVA LTD., George Town, Grand Cayman (KY)

( * ) Notice: Subject to any disclaimer, the term of this patent is extended or adjusted under 35 U.S.C. 154(b) by 373 days.

(21) Appl. No.: 13/750,017

(22) Filed: Jan. 25, 2013

(65) Prior Publication Data

US 2013/0188453 A1    Jul. 25, 2013

Related U.S. Application Data

(60) Provisional application No. 61/590,662, filed on Jan. 25, 2012.

(51) Int. Cl.
*G01V 1/00* (2006.01)
*G01V 1/22* (2006.01)

(52) U.S. Cl.
CPC .............. *G01V 1/22* (2013.01); *G01V 2200/12* (2013.01)

(58) Field of Classification Search
USPC .......................................................... 367/76
See application file for complete search history.

(56) References Cited

U.S. PATENT DOCUMENTS

| | | | |
|---|---|---|---|
| 6,516,422 B1* | 2/2003 | Doblar et al. ................ | 713/503 |
| 7,142,129 B2* | 11/2006 | Hall et al. .................. | 340/853.3 |
| 7,269,095 B2* | 9/2007 | Chamberlain et al. .......... | 367/76 |
| 7,583,560 B2* | 9/2009 | Chamberlain et al. .......... | 367/76 |
| 7,898,904 B2* | 3/2011 | Arnegaard et al. ............. | 367/76 |
| 8,181,057 B2 | 5/2012 | Nichols et al. | |
| 8,594,962 B2 | 11/2013 | Drange | |
| 2004/0105341 A1* | 6/2004 | Chamberlain et al. .......... | 367/21 |
| 2005/0035875 A1* | 2/2005 | Hall et al. .................. | 340/853.1 |
| 2005/0047275 A1* | 3/2005 | Chamberlain et al. .......... | 367/56 |
| 2005/0114033 A1* | 5/2005 | Ray et al. ................... | 702/14 |
| 2006/0093127 A1* | 5/2006 | Zehentner .................... | 379/359 |
| 2006/0155758 A1 | 7/2006 | Arnegaard et al. | |
| 2006/0212226 A1* | 9/2006 | Ray et al. ................... | 702/14 |
| 2007/0253289 A1* | 11/2007 | Chamberlain et al. .......... | 367/51 |
| 2008/0170469 A1* | 7/2008 | Phillips et al. ............... | 367/76 |
| 2008/0189044 A1* | 8/2008 | Chamberlain et al. .......... | 702/14 |
| 2008/0219094 A1* | 9/2008 | Barakat ...................... | 367/21 |
| 2009/0217074 A1 | 8/2009 | Nichols et al. | |
| 2010/0305895 A1* | 12/2010 | Drange ....................... | 702/79 |
| 2011/0251813 A1* | 10/2011 | Coman et al. ................ | 702/89 |

OTHER PUBLICATIONS

International Search Report for PCT/US2013/023117. Apr. 23, 2013 (2 pages).*

(Continued)

*Primary Examiner* — James Hulka
(74) *Attorney, Agent, or Firm* — Mossman, Kumar & Tyler PC

(57) ABSTRACT

The present disclosure relates methods and apparatus for conducting a seismic survey using a fiber optic network. The method may include synchronizing a plurality of seismic devices over a fiber optic network where at least one of the seismic devices is separated from a master clock by at least one other seismic device. The method may also include encoding the master clock signal, transmitting the encoded master clock signal, and recovering the master clock signal. The apparatus may include a fiber optic network with seismic devices. The seismic devices may be arranged in a linear or tree topology.

6 Claims, 3 Drawing Sheets

(56) References Cited

OTHER PUBLICATIONS

International Preliminary Report on Patentability for PCT/US2013/023117 Jul. 29, 2014 (6 pages).*

* cited by examiner

CLOCK SYNCHRONIZATION OVER FIBER

CROSS-REFERENCE TO RELATED APPLICATIONS

This application claims priority from U.S. Provisional Application Ser. No.: 61/590,662, filed Jan. 25, 2012, the disclosure of which is fully incorporated herein by reference in its entirety.

FIELD OF THE DISCLOSURE

This disclosure generally relates to conducting a seismic survey using a network.

BACKGROUND OF THE DISCLOSURE

Seismic surveys are conducted to map subsurface structures to identify and develop oil and gas reservoirs. Seismic surveys are typically performed to estimate the location and quantities of oil and gas fields prior to developing the fields (drilling wells) and also to determine the changes in the reservoir over time subsequent to the drilling of wells. On land, seismic surveys are conducted by deploying an array of seismic sensors (also referred to as seismic receivers) over selected geographical regions. These arrays typically cover 75-125 square kilometers or more of a geographic area and include 2000 to 5000 seismic sensors. The seismic sensors (such as, geophones or accelerometers) are coupled to the ground in the form of a grid. An energy source, such as an explosive charge (buried dynamite for example) or a mobile vibratory source, is used at selected spaced apart locations in the geographical area to generate or induce acoustic waves or signals (also referred to as acoustic energy) into the subsurface. The acoustic waves generated into the subsurface reflect back to the surface from subsurface formation discontinuities, such as those formed by oil and gas reservoirs. The reflections are sensed or detected at the surface by the seismic sensors. Data acquisition units deployed in the field proximate the seismic sensors may be configured to receive signals from their associated seismic sensors, at least partially process the received signals, and transmit the processed signals to a remote unit (typically a central control or computer unit placed on a mobile unit). The central unit typically controls at least some of the operations of the data acquisition units and may process the seismic data received from all of the data acquisition units and/or record the processed data on data storage devices for further processing. The sensing, processing and recording of the seismic waves is referred to as seismic data acquisition.

The traditional sensor used for acquiring seismic data is a geophone. Multi-component (three-axis) accelerometers, however, are more commonly used for obtaining three-dimensional seismic maps. Compared to seismic surveying layouts using the single component sensors, layouts using multi-component sensors require use of more complex data acquisition and recording equipment in the field and a substantially greater bandwidth for the transmission of data to a central location.

A common architecture of seismic data acquisition systems is a point-to-point cable connection of all of the seismic sensors. Typically, output signals from the sensors in the array are collected by data acquisition units attached to one or more sensors, digitized and relayed down the cable lines to a high-speed backbone field processing device or field box. The high-speed backbone is typically connected via a point-to-point relay with other field boxes to a central recording system, where all of the data are recorded onto a storage medium, such as a magnetic tape.

Seismic data may be recorded at the field boxes for later retrieval, and in some cases a leading field box is used to communicate command and control information with the central recording system over a radio link (radio frequency link or an "RF" link). Even with the use of such an RF link, kilometers of cabling among the sensors and the various field boxes may be required. Such a cable-system architecture can result in more than 150 kilometers of cable deployed over the survey area. The deployment of several kilometers of cable over varying terrain requires significant equipment and labor, often in environmentally sensitive areas.

Due to the high speed of acoustic waves through earth formations and the sensitivity required to resolve seismic signals, timing precision is of considerable importance in seismic data acquisition. Traditionally, timing precision has been achieved through clock synchronization of remote units arranged in a point-to-point topology with a master clock. However, these systems are limited in configuration since the master clock must interface with each of the remote units individually. What is needed is a system that allows for clock synchronization to be implemented over remote units arranged using a line and/or tree topology. This disclosure discusses such a system.

SUMMARY OF THE DISCLOSURE

In aspects, the present disclosure is related to methods and apparatuses for conducting a seismic survey using a fiber optic network.

One embodiment according to the present disclosure includes a method for conducting a seismic survey, comprising: synchronizing a plurality of seismic devices over a fiber optic network using a recovered master clock signal, wherein at least one of the seismic devices is separated from a master clock by at least one other of the seismic devices.

In some embodiments, the master clock and the plurality of seismic devices may be arranged in at least one of: (i) a linear topology and (ii) a tree topology. Synchronizing the plurality of seismic devices in some embodiments may be carried out by encoding the master clock signal in a data stream along with at least one of i) a signal containing seismic data, and 2) a signal containing command and control information; transmitting the data stream directly to one of the at least one other of the seismic devices; and propagating the master clock signal to the at least one of the seismic devices through subsequent seismic devices of the at least one other of the seismic devices. Propagating the master clock signal may be carried out by performing at each subsequent seismic device: recovering the master clock signal from a received data stream at the subsequent device; locking a local clock at the subsequent device to the master clock with the recovered master clock signal using a locking circuit; encoding the local clock signal as the master clock signal in a data stream, the data stream comprising at least one of a 4B5B bit stream and a 8B10B bit stream; and transmitting the data stream directly to another of the subsequent seismic devices. The data stream may be at least one of a 4B5B bit stream and a 8B10B bit stream.

Another embodiment according to the present disclosure includes a system for conducting a seismic survey, comprising: a master clock configured to generate a master clock signal; a plurality of seismic devices in communication with the master clock, wherein at least one of the seismic devices receives the master clock signal through the at least one other of the seismic devices, and a network of fiber optics configured to connect the master clock and the plurality of seismic devices and to transmit at least one signal not related to the master clock signal. The system may be configured to propagate the master clock signal through the at least one other of the seismic devices without the use of a dedicated physical channel for the master clock signal.

In some embodiments, the network is configured to transmit seismic data signals on the same physical channel as the master clock signal. The master clock and the plurality of seismic devices may be arranged in at least one of: (i) a linear topology and (ii) a tree topology. At least one of the seismic devices may include seismic sensors. At least one other of the seismic devices may comprise a local clock and be configured for: recovering the master clock signal from a received data stream; locking the local clock to the master clock using the recovered master clock signal; and encoding the local clock signal as the master clock signal in a data stream and transmitting the data stream to at least one subsequent seismic device.

Some embodiments may include circuits in one or more seismic devices including circuits configured for recovering the master clock signal from a received data stream; circuits configured for locking the local clock to the master clock using the recovered master clock signal; and circuits configured for encoding the local clock signal as the master clock signal in a data stream and transmitting the data stream to at least one subsequent seismic device.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

The present disclosure relates to devices and methods for conducting seismic survey activities relating to seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein. A description for some embodiments for conducting a seismic survey follows below.

Figure 1:
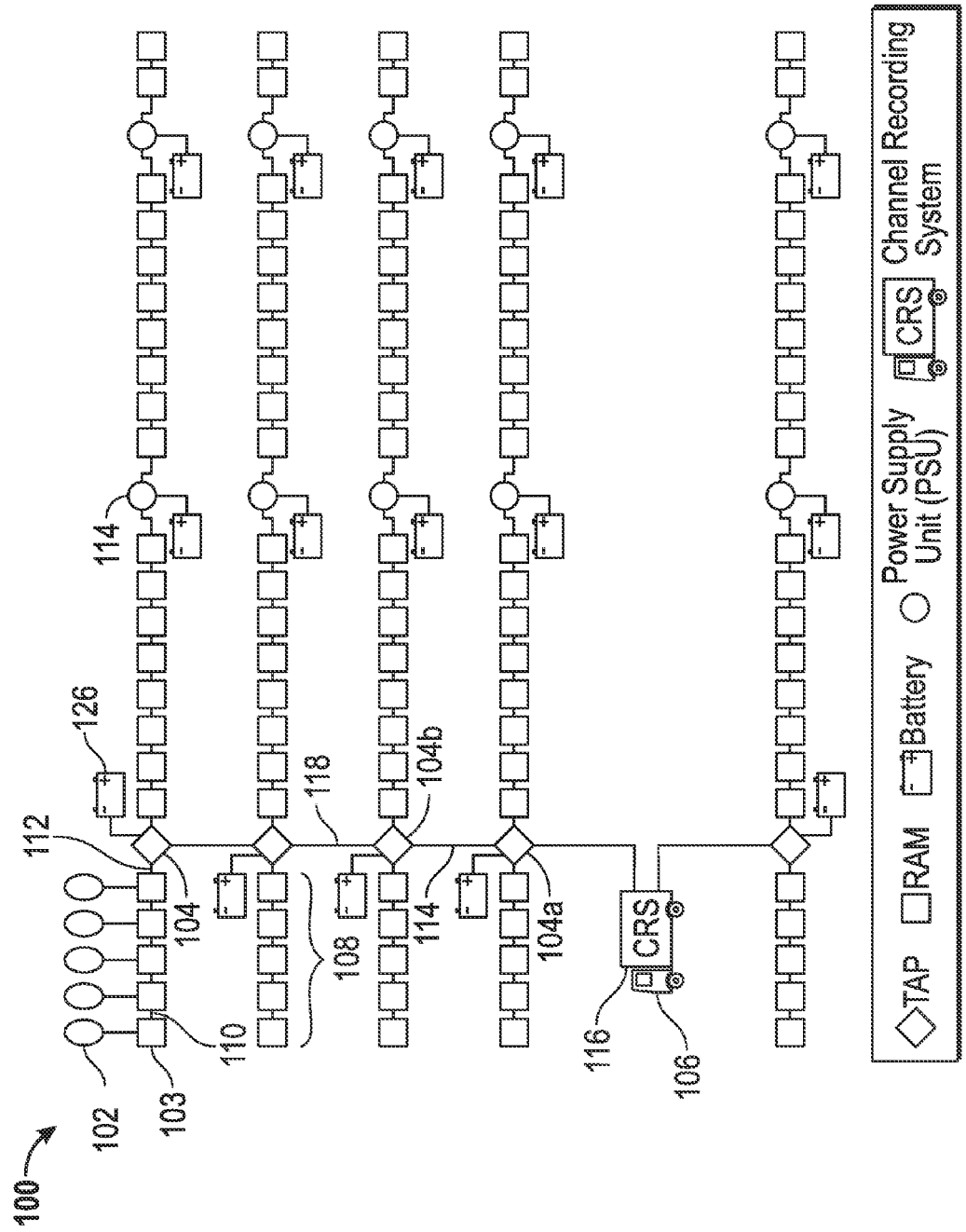
FIG. 1 shows a schematic of a seismic survey system according to one embodiment of the present disclosure.

FIG. 1 depicts an embodiment of a cable seismic data acquisition system 100. Such a system includes an array (string) of spaced-apart seismic sensor units 102. Seismic sensors units 102 may include, but are not limited to, one more of: geophones and hydrophones. Each sensor 102 is typically coupled via cabling to a data acquisition device (such as remote acquisition module (RAM) 103), and several of the data acquisition devices and associated sensors are coupled via cabling 110 to form a line or group 108. The group 108 is then coupled via cabling 112 to a line tap (such as fiber TAP unit (FTU) 104). Cable 112 may include, but is not limited to, one or more of: (i) copper conductors and (ii) fiber optic cable. Several FTUs 104 and associated lines 112 are usually coupled together by cabling, such as shown by the baseline cable 118. Baseline cable 118 includes fiber optic cable.

A RAM 103 may be configured to record analog seismic signals that are generated by seismic sensors 102, including, but not limited to, geophones and hydrophones. The RAM 103 may be configured to convert analog signals from the seismic sensors 102 into digital signals. The digitized information may then be transmitted to an FTU 104. Some RAMs 103 are configured to relay signals from other RAMs 103 in group 108, in addition to receiving signal from one or more seismic sensors 102. The digitized information transmitted by the RAM 103 may be augmented with status information. The FTU 104 may be configured to transmit the digitized information to a central recording system (CRS) 106. In some embodiments, the RAM 103 may be configured to receive programming and/or parameter information downloads from the CRS 106. RAMs 103 generally receive power from another device, such as a power supply unit (PSU) 114 or FTU 104, however, RAMs 103 may be configured to include a battery.

The FTU 104 may be configured to receive digital information from one or more RAMs 103 and retransmit that information to the CRS 106. In some embodiments, retransmitted digital information may be augmented with status information for the FTU 104. The FTU 104 may also be configured to supply power to one or more RAMs 103. FTU 104 may itself receive power from a battery 126 or PSU 114. The FTU 104 may include multiple battery ports so that power may remain uninterrupted to the FTU 104 and any connected RAMs 103 when battery 126 is undergoing replacement.

The PSU 114 includes a power supply and may be configured to transmit power to the RAMs 103. In some configurations, the power from the PSU 114 may be transmitted to the RAMs 103 through the FTU 104. PSU 114 may receive power from a battery 130. The devices involved in seismic data acquisition may be collectively referred to as "seismic devices," which may include, but is not limited to: seismic sensors 102, RAMs 103, and FTUs 104, CRS 106, and auxiliary device 116.

In some embodiments, the RAM 103 and/or the FTU 104 may be used as an auxiliary device 116. An auxiliary device 116 may be configured to operate as a timing device. The auxiliary device 116 may be positioned in a recording truck or other comparable location. In some embodiments, the auxiliary device 116 may be dedicated as a timing device. The auxiliary device 116 may be in communication with baseline cables 118 and configured to the exact timing of the seismic shooting system to ensure that the T-zero is consistent. In some embodiments, the CRS 106 may provide the timing signal. The CRS 106 may be positioned in a recording truck or other comparable location.

In the field, the sensors 102 are usually spaced between 10-50 meters. Each of the FTUs 104 typically performs some signal processing and then stores the processed signals as seismic information. The FTUs 104 may be coupled, either in parallel or in series, with one of the units 104a serving as an interface between the CRS 106 and one or more FTUs 104. In the cable system of FIG. 1, data are usually relayed from RAM 103 to the next RAM 103 and through several FTUs 104 before such data reaches the CRS 106.

In a typical configuration, a plurality of RAMs 103 may be laid out in intervals (such as 12 @55 meters) and connected to receiver cable lines. The receiver cable lines may also be connected to FTUs 104 and PSUs 114. The PSUs 114 may be laid out in intervals as well. The PSUs 114 may be connected to RAMs 103 in a one-to-one or a one-to-many relationship. The FTUs 104 may be laid out at intersecting points of the receiver line cables 112 and baseline fiber optic cables 118. The FTUs 104 may be connected to other FTUs 104 and/or the CRS 106 via fiber baseline cables 118.

In some embodiments, the FTUs 104 may communicate with the CRS 106 using radio frequency transmissions and are typically bandwidth limited. In traditional wireless seismic data acquisition systems, an attribute (physical or seismic) degradation affecting the data quality is typically detected by monitoring (printing and viewing) shot (source activation) records immediately after recording.

Figure 2:
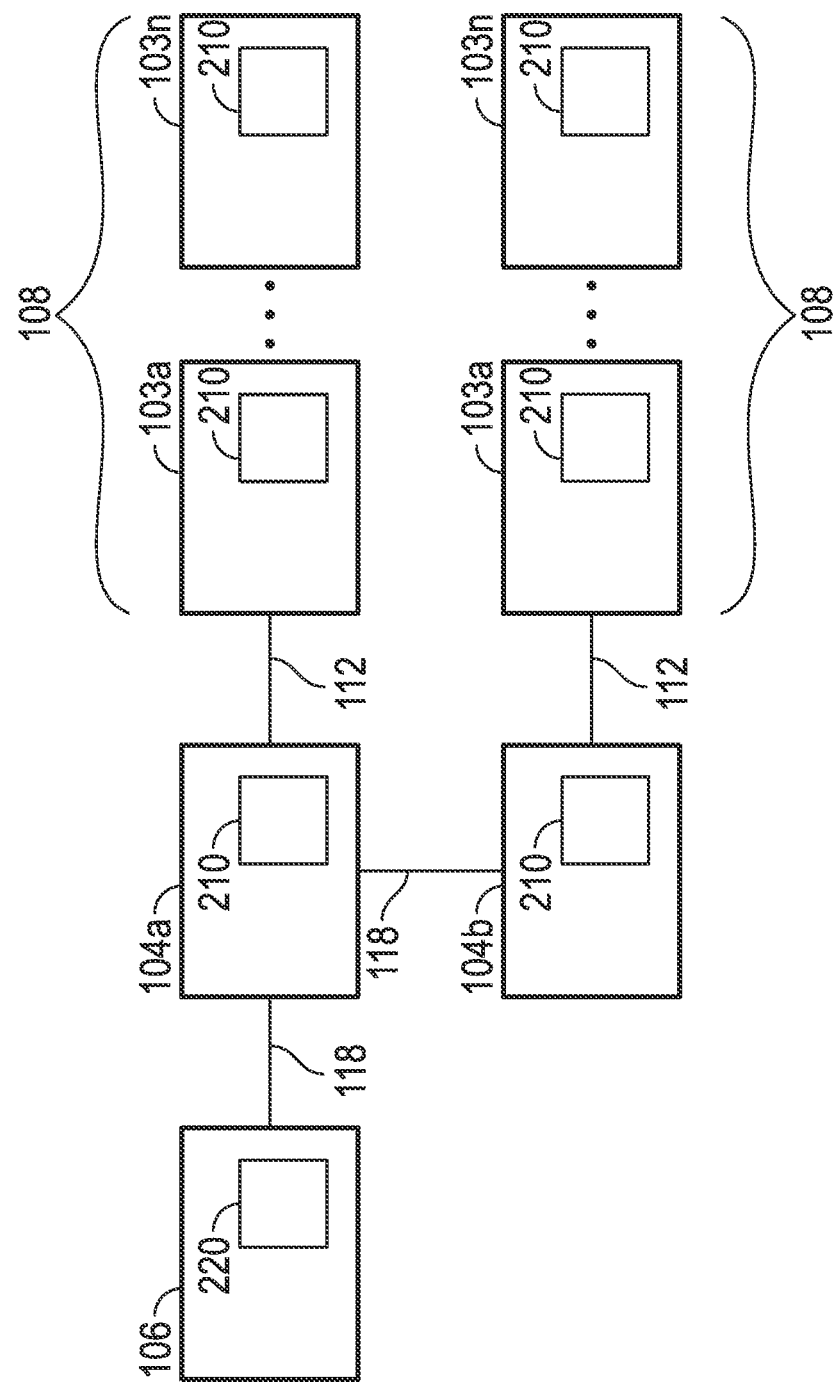
FIG. 2 shows a schematic of the seismic devices including clocks within seismic devices for performing a clock synchronization according to one embodiment of the present disclosure.

FIG. 2 shows a schematic diagram for clock synchronization. Each of the seismic devices (RAMs 103a-n and FTUs 104a-b) may include a local clock 210. While FIG. 2 shows two FTUs 104a, 104b connected to CRS 106, this is illustrative and exemplary only, as many FTUs 104 may be connected to CRS 106 through a line of FTUs 104. The master clock 220 may reside in an auxiliary unit 116 dedicated to timing or the CRS 106. In FIG. 2, the CRS 106 includes master clock 220 and is configured to generate a time signal that may be encoded in a data stream. The data stream is conveyable over a fiber optic cable, such as in baseline cable 118. In some embodiments, line cable 112 may also include fiber optic cable. In some embodiments, the data stream includes at least one of: (i) an 8B10B bit stream and (ii) a 4B5B bit stream.

Figure 3:
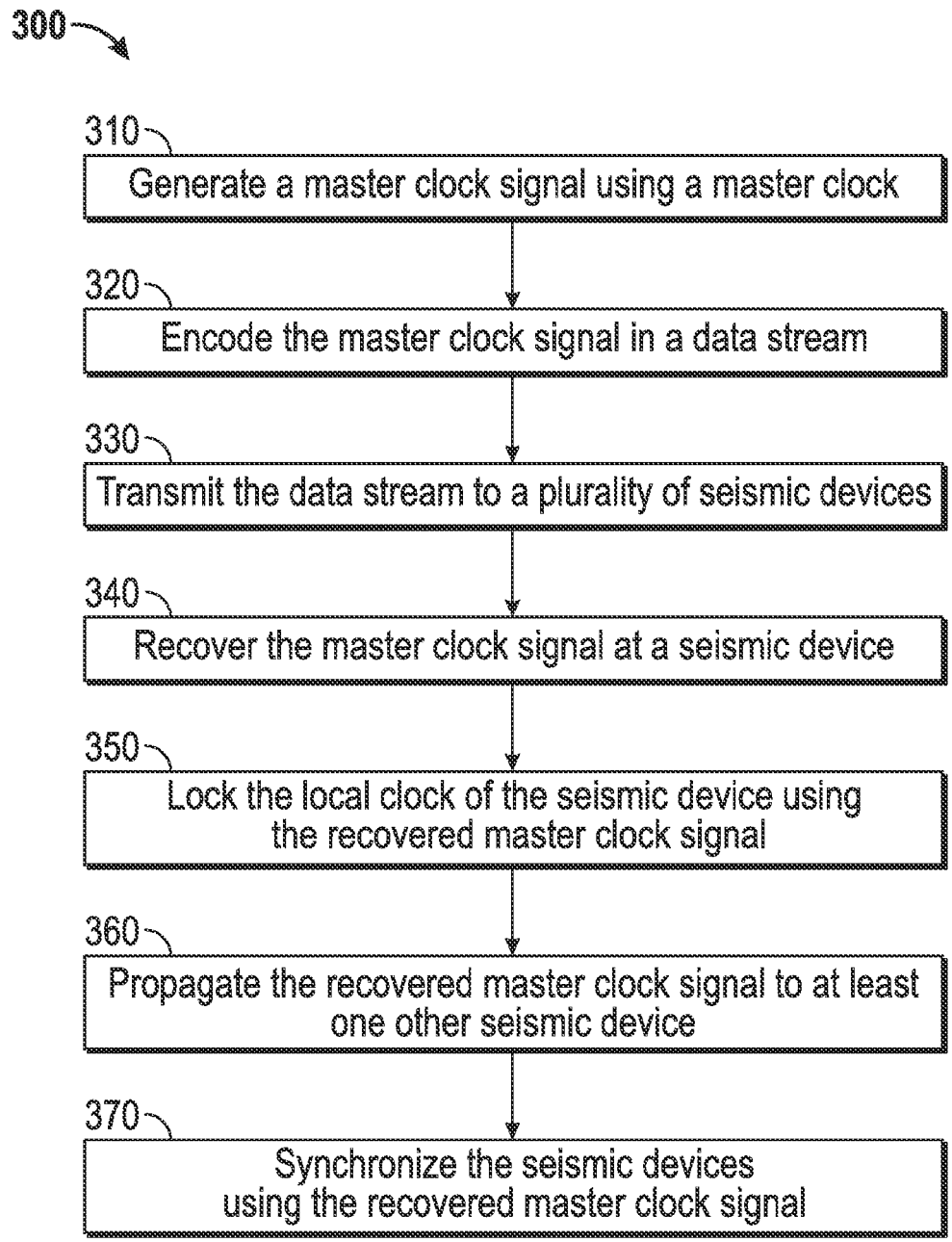
FIG. 3 shows a flow chart for a method for one embodiment according to the present disclosure.

FIG. 3 shows a flow chart 300 for synchronizing a clock in a seismic device using a master clock signal generated at CRS 106 and recovered by another seismic device. To improve data accuracy, it is desirable to have all of the system components synchronized by a master clock to ensure that the seismic devices are using the same T-zero. In step 310, a master clock signal is generated by a master clock 220. The master clock 220 may be part of the CRS 106 or an auxiliary unit 116 dedicated to timing. In step 320, the master clock signal may be encoded into a data stream that is in communications with other seismic devices, such as one or more FTUs 104 and/or a RAM group 108 including RAMs 103a through 103n arranged in a linear topology. In step 330, the data stream is transmitted directly to at least one FTU 104. In step 340, the master clock signal may be recovered from the data stream by the FTU 104. In step 350, a local clock 210 in the FTU 104 may be locked using the recovered master clock signal. The local clock 210 may be locked with the master clock using a phase-locked loop circuit or other locking circuit known to those of skill in the art. The recovered master clock signal may then be propagated through the subsequent remaining devices along the network topology, so that the master clock signal is propagated from the top level of the line or tree downwards until the last desired seismic device receives the master clock signal. For example, referring again to FIG. 2, the master clock signal may be propagated from the master clock 220 in CRS 106 to the local clock 210 on the subsequent device (FTU 104a), followed by either or both of the next subsequent devices (FTU 104b and RAM 103a), and so on until the last desired device(s) (RAM 103n on the FTU 104a branch, RAM 103n on the FTU 104b branch, etc.) receive the master clock signal.

In step 360, the recovered master clock signal is propagated to another seismic device, such as another FTU 104b and/or RAM 103a. This may be carried out by encoding the local clock signal as the master clock signal in a data stream. In step 370, the another seismic device (FTU 104b, RAM 103a) may be synchronized using the propagated master clock signal. Steps 340 to 370 may be repeated using each subsequent seismic device (FTU 104, RAM 103) to synchronize the clock of the next seismic device (FTU 104, RAM 103). Although step 330 shows the data stream as transmitted directly to at least one FTU 104, in other embodiments, the data stream may be transmitted directly to at least one RAM 103a for recovery and subsequent propagation to other RAMs 103b-103n as described above.

For example, in FIG. 2, when propagating the clock signal along a series of FTUs 104, step 360 may include transmitting the recovered clock signal in FTU 104a to FTU 104b over fiber, which, in step 370, enables FTU 104b to be synchronized with the master clock 220. In another example, when propagating the clock signal along group 108, step 360 may include transmitting the recovered clock signal in FTU 104a to RAM 103a over fiber, which, in step 370, allows RAM 103a to be synchronized with master clock 220. In some embodiments, the clock signal may be propagated along a line of FTUs 104 and/or along a line of RAMs 103.

While the foregoing disclosure is directed to the one mode embodiments of the disclosure, various modifications will be apparent to those skilled in the art. It is intended that all variations be embraced by the foregoing disclosure.

What is claimed is:

1. A method of conducting a seismic survey, comprising:
    synchronizing a plurality of seismic devices over a fiber optic network using a recovered master clock signal, wherein at least one of the seismic devices is separated from a master clock by at least one other of the seismic devices, wherein the master clock and the plurality of seismic devices are arranged in at least one of: (i) a linear topology and (ii) a tree topology;
    encoding the master clock signal in a data stream along with at least one of i) a signal containing seismic data, and 2) a signal containing command and control information, the data stream comprising at least one of a 4B5B bit stream and a 8B10B bit stream;
    transmitting the data stream directly to one of the at least one other of the seismic devices; and
    propagating the master clock signal to the at least one of the seismic devices through subsequent seismic devices of the at least one other of the seismic devices by performing at each subsequent seismic device:
        recovering the master clock signal from a received data stream at the subsequent device;
        locking a local clock at the subsequent device to the master clock with the recovered master clock signal using a locking circuit;
        encoding the local clock signal as the master clock signal in a data stream, the data stream comprising at least one of a 4B5B bit stream and a 8B10B bit stream; and
    transmitting the data stream directly to at least one subsequent seismic devices.

2. The method of claim 1, using a phase-locked loop circuit to lock the local clock with the master clock.

3. The method of claim 1, wherein the master clock signal received by each of the plurality of seismic devices is one of:

(i) directly received from the master clock and (ii) indirectly received through propagation using a local clock in the at least one other of the plurality of seismic devices.

4. A system for conducting a seismic survey, comprising:
a master clock configured to generate a master clock signal;
a plurality of seismic devices in communication with the master clock, wherein at least one of the seismic devices receives the master clock signal through the at least one other of the seismic devices, at least one of the seismic devices comprises seismic sensors, and
a network of fiber optics configured to connect the master clock and the plurality of seismic devices;
wherein the network of fiber optics is configured to transmit seismic data signals on the same physical channel as the master clock signal;
wherein the master clock and the plurality of seismic devices are arranged in at least one of: (i) a linear topology and (ii) a tree topology, and at least one of the seismic devices comprises seismic sensors; and
wherein the at least one other of the seismic devices comprises a local clock and is configured for:
propagating the master clock signal to the at least one of the seismic devices through subsequent seismic devices of the at least one other of the seismic devices by performing at each subsequent seismic device:
recovering the master clock signal from a received data stream at the subsequent device;
locking the local clock to the master clock using the recovered master clock signal; and
encoding the local clock signal as the master clock signal in a data stream and transmitting the data stream to at least one subsequent seismic device; and
transmitting the data stream directly to at least one subsequent seismic devices.

5. The system of claim 4, wherein each of the plurality of seismic devices comprises:
a phase-locked loop circuit configured to lock the local clock with the master clock signal.

6. The system of claim 4, wherein each of the plurality of seismic devices is configured to receive the master clock signal from one of: (i) a direct link to the master clock and (ii) an indirect link through the at least one other of the plurality of seismic devices.

* * * * *